18
United States Patent Office 3,440,158
Patented Apr. 22, 1969

3,440,158
PREPARATION OF ESTERS OF α,α'-DIMETHYLMUCONIC ACID
George Suld, Springfield, Pa., assignor to Sun Oil Company, Philadelphia, Pa., a corporation of New Jersey
No Drawing. Filed June 30, 1966, Ser. No. 561,736
Int. Cl. B01j 1/10
U.S. Cl. 204—158
6 Claims

ABSTRACT OF THE DISCLOSURE

This invention relates to the preparation of esters of α,α'-dimethylmuconic acid which more specifically are dialkyl α,α'-dimethyl-trans-trans muconates. The esters are prepared from either the cis-cis or cis-trans forms of α,α'-dimethylmuconic acid (hereinafter DMMA) by esterifying the acid with an alkanol while concurrently causing isomerization to trans-trans configuration by irradiating the reacting mixture with ultraviolet light. The trans-trans diester products have particular utility in the preparation of polymers.

---

The unsaturated diacid, α,α'-dimethylmuconic acid can exist in three isomeric forms, viz. cis-cis, trans-trans, and cis-trans, which can be depicted by the following structural formulas:

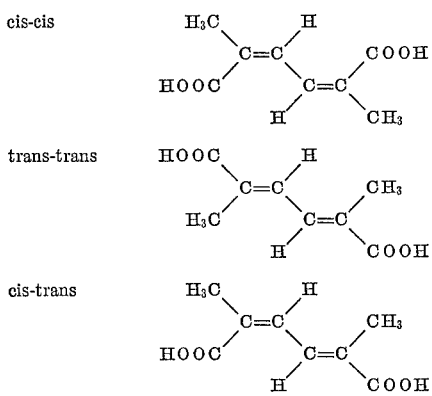

The preparation of each of these isomeric forms has been described in the prior art by Elvidge et al., J. Chem. Soc., pages 1026–1033 (1952). These authors show that oxidation of p-xylenol by means of peracetic acid gave the cis-cis form of the acid. The other isomeric forms were obtained indirectly by conversion of the cis-cis form. Also dimethyl esters of each of the three isomeric forms were prepared by shaking the respective DMMA with ethereal diazomethane.

The cis-cis form of DMMA can also be obtained by biological oxidation of p-xylene utilizing special strains of micro-organisms as disclosed in United States application Ser. No. 509,621, filed Nov. 24, 1965, now U.S. Patent No. 3,383,289.

From the foregoing it can be seen that, as a general rule, only the cis-cis form of DMMA is obtained by either chemical or biological oxidation procedures.

DESCRIPTION OF THE INVENTION

The present invention provides a procedure for the facile conversion of cis-cis DMMA into dialkyl esters of trans-trans DMMA in high yield. The method is equally applicable to the conversion of cis-trans DMMA, although the cis-cis acid normally would be the starting material since it is the more easily obtainable isomer. The resulting trans-trans diesters are useful for reaction with diols to make both crystalline and non-crystalline polyesters which are capable of being cross-linked, as disclosed in United States application Ser. No. 574,939, filed Aug. 25, 1966 by G. L. Driscoll. Polymers made from the trans-trans diesters generally have higher molecular weights and higher melting points than those made from the cis-cis diesters and they also are more readily cross-linkable due to the trans-trans configuration in the polymer chains.

The reaction effected by means of the invention involves esterification of the starting DMMA and concurrent isomerization to form the trans-trans configuration. The reaction can be depicted by the following equation for the conversion of cis-cis DMMA:

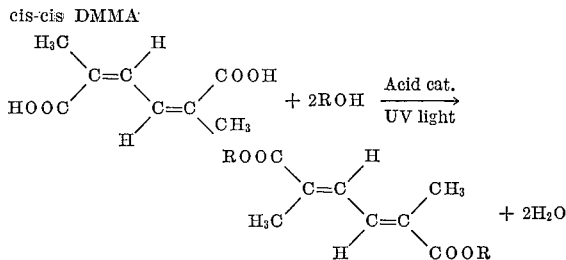

As shown by the equation, both carboxyl groups of the starting acid undergo esterification while concurrently an inversion of the cis double bonds occurs to yield the trans-trans diester. This product generally is obtained in a purity of at least 90%.

Specifically the method of the invention comprises the following steps:

(a) Forming a mixture of α,α'-dimethylmuconic acid (either cis-cis or cis-trans) with a stoichiometric excess of an alkanol having 1–20 carbon atoms;

(b) Reacting the mixture under esterification conditions in the presence of an acidic esterification catalyst and while subjecting the mixture to irradiation by ultraviolet (UV) light, whereby esterification of the acid and concurrent isomerization to trans-trans configuration occurs;

(c) And recovering the resulting dialkyl α,α'-dimethyl-trans-trans muconate from the reaction mixture.

The application of UV irradiation while simultaneously carrying out the esterification reaction is essential for achieving the objective of producing mainly the trans-trans diester product. By way of comparison, when the UV light is omitted, esterification occurs but the dimethyl-trans-trans muconate is only a minor component of the product. On the other hand, if cis-cis DMMA is subjected to UV irradiation without concurrent esterification, only a slow and inefficient transformation to the trans-trans isomer is obtained.

The alcohol used for the esterification can be any alkanol having 1–20 carbon atoms. As used herein the term "alkanol" includes cycloalkanols. The alcohol can be straight chain, branched chain or cyclic and can include primary, secondary and tertiary alkyl and cycloalkyl groups. Examples of suitable alcohols are methanol, ethanol, propanol, isopropanol, butanols, pentanols, cyclopentanol, cyclohexanol, octanols, cyclododecanol, and neopentyl, lauryl, cetyl and stearyl alcohols. Lower alkanols of the $C_1$–$C_5$ range usually are preferred.

A stoichiometric excess of the alcohol relative to the cis-cis or cis-trans DMMA preferably is used. Since the DMMA generally has a low solubility in the alcohol, the starting mixture normally is in the form of a dispersion of DMMA in the alcohol. On the other hand, the ester product has substantially higher solubility in the alcohol so that the mixture tends to become homogeneous as the reaction proceeds. When the alcohol used has substantial miscibility with water, it is particularly desirable that a large excess of the alcohol be present in order that the concentration of water in solution does not become high enough to inhibit esterification before the reaction is completed. When an alcohol having poor miscibility with water is employed, a large excess is not required. In the latter case water can readily be removed as it forms by refluxing the alcohol and trapping out the water from the condensate before the alcohol is recycled to the reaction zone.

Any conventional or suitable acidic esterification catalyst can be used, for example, concentrated sulfuric or hydrochloric acid, boron trifluoride, or an acidic ion exchange resin.

The temperature for conducting the esterification-isomerization reaction is in the range of 20–200° C. and more preferably 50–150° C. The reaction is carried out under conditions providing suitable agitation to maintain good contact between the DMMA particles and the alcohol phase.

As previously stated, the reaction mixture must be subjected to irradiation by UV light while the esterification is proceeding. This can be done by placing one or more mercury vapor lamps, preferably of the immersion type, in the reaction zone and operating the same during the reaction. Irradiation in this manner causes the diester product to be preponderantly the trans-trans isomer. In the absence of UV light the product would be mainly the cis-cis isomer together with a substantial proportion of the cis-trans isomer.

The time required for the raction to approach completion depends upon various factors such as the particular alcohol used, the ratio of alcohol to DMMA and the reaction temperature employed. Suitable reaction times usually will be in the range of 0.5–24 hours.

After the reaction is completed, the mixture is worked up to recover the esterification product, which generally is a solid, from the excess alcohol. When a water soluble alcohol has been used such as methanol or ethanol, the excess alcohol along with catalyst can be removed by diluting the mixture with cold water and filtering out the solid diester. In the case of a higher alcohol that has no substantial water solubility, the catalyst can be washed out by means of water and the alcohol can then be removed by distillation.

The following examples compare the results of, respectively, employing and omitting UV light irradiation in carrying out the esterification.

EXAMPLE 1

The reaction mixture was a suspension of 20.0 g. (0.12 mole) of cis-cis DMMA in 400 ml. (10 moles) of abs. methanol to which were added 2 ml. of conc. sulfuric acid. The flask containing the mixture was connected to a reflux condenser and positioned beside a 140 watt mercury vapor lamp which provided unfiltered UV radiation. The mixture was subjected to the radiation and refluxed for 19 hours, during which time it became homogeneous. After completion of the reaction the hot mixture was poured over chipped ice and the diester product was obtained as a crystalline precipitate which was separated by filtration. Upon drying 16.2 g. (70% yield) of dimethyl $\alpha,\alpha'$-dimethylmuconate were obtained. By vapor phase chromatography this product was shown to contain about 90% of the trans-trans isomer. After recrystallization from methanol the product was found to have a melting point of 101–102° C. This compares with literature values for the three dimethyl ester isomers of 99–100° C. for trans-trans, 69–70° C. for cis-cis and 26–27° C. for cis-trans (as reported by Elvidge et al., loc cit).

EXAMPLE 2

Another run was made in substantially the same manner as Example 1 except that the esterification was carried out for 21 hours and the reaction mixture was not irradiated with UV light. Crystalline diester product was obtained in a yield of about 66% of theoretical. As shown by vapor phase chromatography this product was a mixture of the three stereoisomers in the following weight proportions:

| | Percent |
|---|---|
| Cis-cis diester | 59 |
| Cis-trans diester | 32 |
| Trans-trans diester | 9 |

Comparison of these results with Example 1 shows the importance of using UV irradiation in producing the desired trans-trans product.

When cis-trans DMMA is substituted for the cis-cis diacid in the foregoing examples, substantially equivalent results are obtained. Likewise analogous results are obtained when other alkanols as herein described are substituted for methanol.

I claim:
1. Method of preparing a dialkyl $\alpha,\alpha'$-dimethyl-trans-trans muconate which comprises:
   (a) forming a mixture of $a,a'$-dimethylmuconic acid of the cis-cis or cis-trans configuration with a stoichiometric excess of an alkanol having 1–20 carbon atoms;
   (b) reacting said mixture under esterification conditions in the presence of an acidic esterification catalyst and while subjecting the mixture to irradiation by ultraviolet light, whereby esterification of said acid and concurrent isomerization to trans-trans configuration occurs;
   (c) and recovering the resulting dialkyl $\alpha,\alpha'$-dimethyl-trans-trans muconate from the reaction mixture.

2. Method according to claim 1 wherein step (b) is conducted at a temperature in the range of 50–150° C.

3. Method according to claim 2 wherein said alkanol has 1–5 carbon atoms.

4. Method according to claim 3 wherein step (b) is carried out by refluxing the alkanol.

5. Method according to claim 3 wherein said alkanol is methanol or ethanol.

6. Method according to claim 1 wherein said acid used in step (a) has cis-cis configuration.

References Cited

UNITED STATES PATENTS 3,413,336  11/1968  Hulsmann et al. ____ 204 158 X

HOWARD S. WILLIAMS, *Primary Examiner.*